United States Patent Office 3,049,023
Patented Aug. 14, 1962

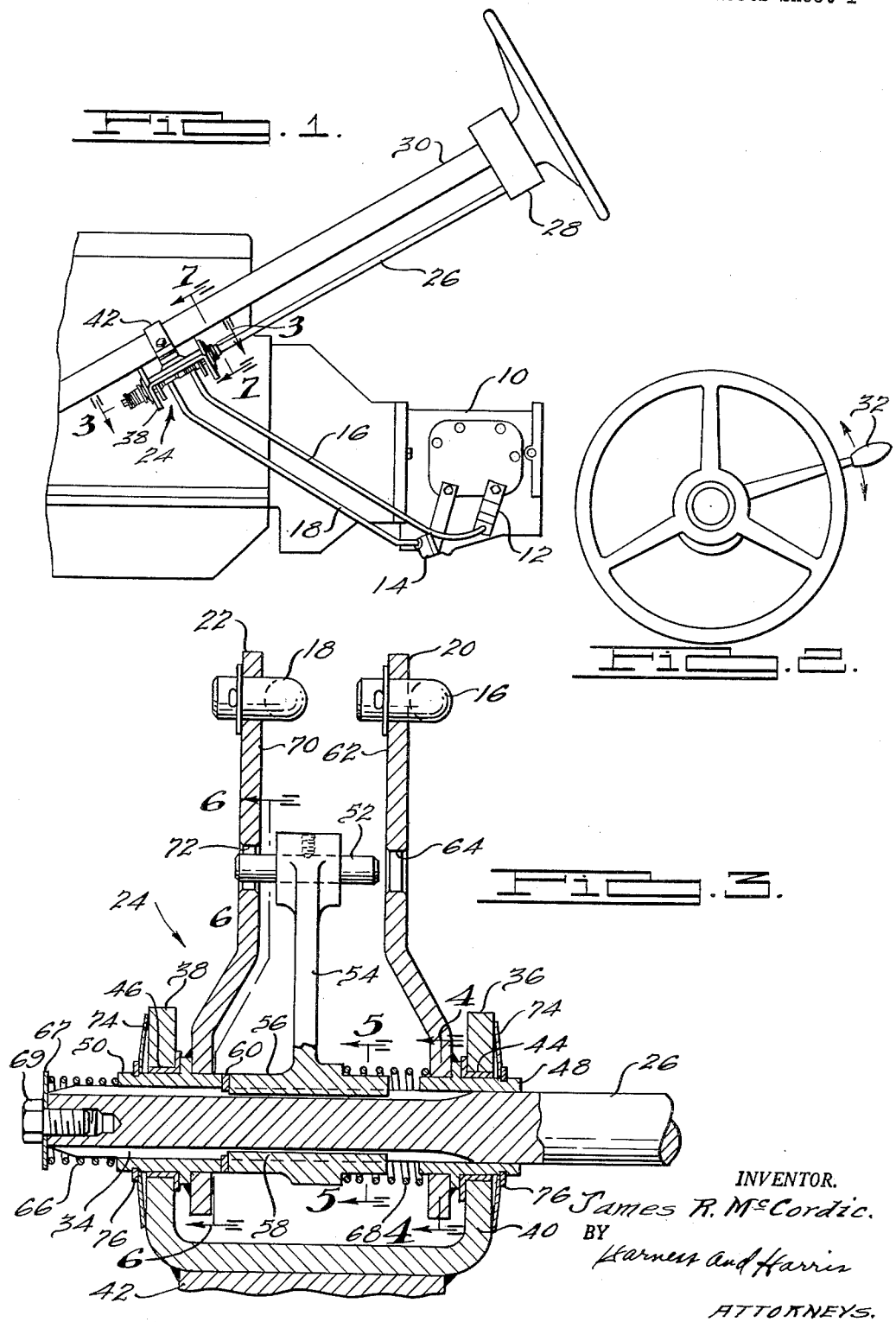

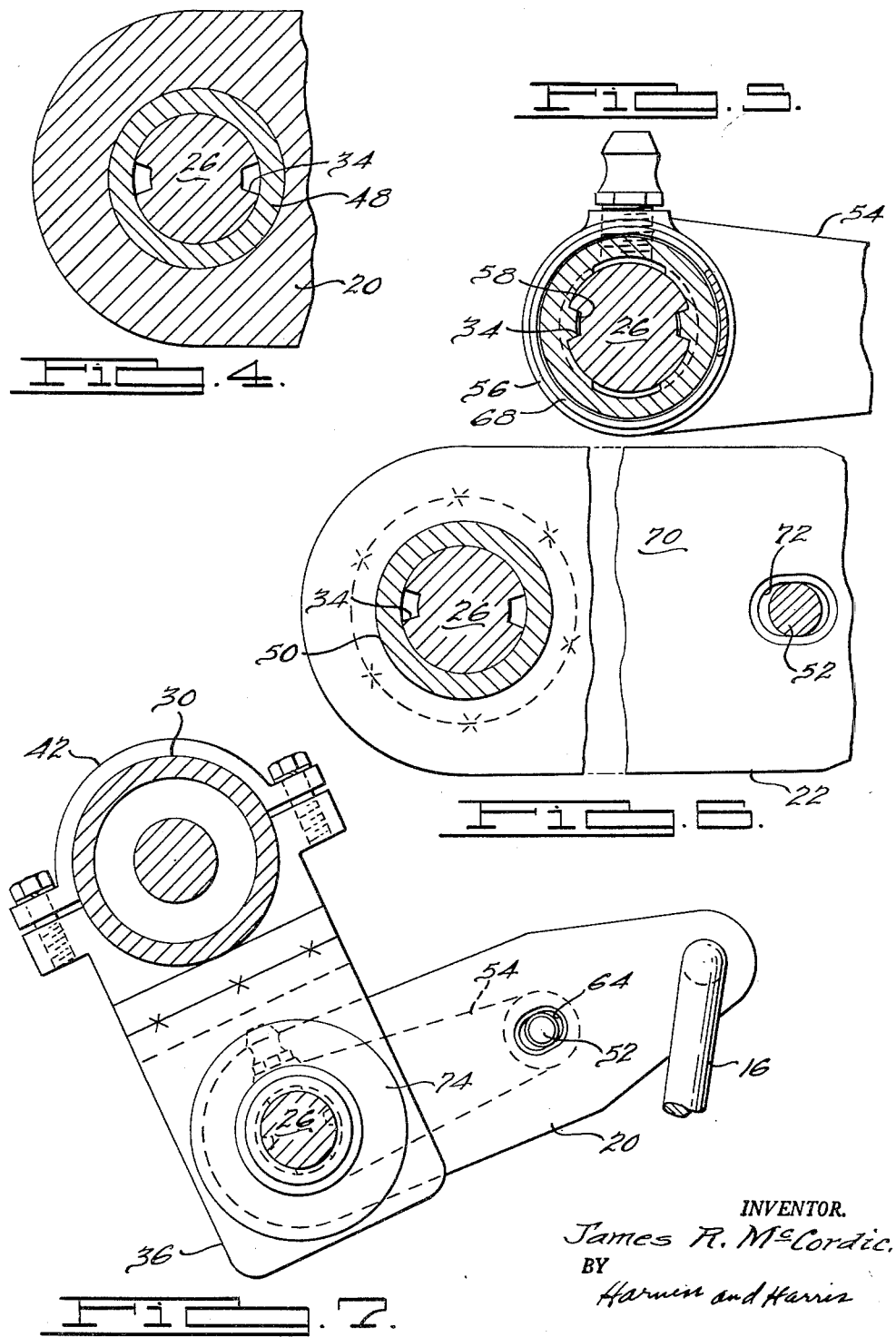

3,049,023
TRANSMISSION GEAR SELECTOR MECHANISM
James R. McCordic, Royal Oak, Mich., assignor to Chrysler Corporation, Highland Park, Mich., a corporation of Delaware
Filed Nov. 2, 1959, Ser. No. 850,411
7 Claims. (Cl. 74—484)

This invention relates to a transmission gear train selector mechanism manually operable by means of a gear shifting member and designed to minimize the need for deliberate manual movement of the shift lever in the conventional H shifting pattern normally used in manually operated transmission gear train selector mechanisms.

The conventional gear selector mechanisms utilize an H shifting pattern in order to complete the selection of the reverse to first to second to high transmission gearing. In prior art devices it is necessary to consciously and deliberately move the hand shifting lever from either the first or reverse gear position to a neutral position, then transversely to this direction of movement to pick up the second-high gear shift arm before making the final shifting motion to either the second or high gear train. Quite often an attempted rapid shifting from first gear to second gear will result in passing by the neutral spot and a partial shifting into reverse gear and a consequent grinding of the gears and possible damage thereto.

The principal object of this invention is to eliminate the necessity of having to consciously locate the neutral position of the hand lever before placing the gear into either high gear or second gear from the first gear or reverse gear positions. This object is accomplished in the present invention by the provision of a splined shifting member and a splined shifting finger slidably associated therewith. The splined finger carries a shifting pin which is constantly urged by means of a spring into engagement with the second-high transmission gear train selector arm and either rides across the surface of this arm or engages in the shifting aperture therein. In order to shift the first and reverse gear train selector arm it is necessary to lift and position the shifting member and the finger splined thereto into engagement with the shifting aperture in the first-reverse selector arm and move this arm to either the first or reverse gear position. However, when this shifting is accomplished and the hand shifting lever is released, the shifting finger splined to the shifting member is urged downwardly into engagement with the upper surface of the second-high actuator arm and subsequent shifting of the transmission to second gear or to high gear is accomplished merely by moving the hand lever in a common plane clockwise or counterclockwise, respectively. The actual movement, therefore, of the manual shifting lever is not a conscious H pattern and the proper engagement of the second-high selector lever 22 by pin 52 is automatic upon movement of the manual shifting lever in a single plane.

Another object is to simplify the initial setting of the manual shifting mechanism with respect to the position of the transmission gear trains.

Further objects and advantages of the present invention will become apparent from the following description of the drawings, in which:

FIGURE 1 is a side view of the manually operated transmission gear selector mechanism;

FIGURE 2 is an end view of the steering column showing the hand lever;

FIGURE 3 is a cross sectional view of FIGURE 1 taken along the line 3—3 thereof in the direction of the arrows;

FIGURE 4 is a cross-sectional view of FIGURE 3 taken along the line 4—4 thereof in the direction of the arrows;

FIGURE 5 is a cross-sectional view of FIGURE 3 taken along the line 5—5 thereof in the direction of the arrows;

FIGURE 6 is a partial cross-sectional view of FIGURE 3 taken along the line 6—6 thereof in the direction of the arrows; and FIGURE 7 is an end view of the selector mechanism of FIGURE 1 taken along the line 7—7 thereof in the direction of the arrows.

Referring to the drawings, and particularly to FIGURE 1, a transmission 10 of a conventional and well known type shown for example in Patent No. 2,299,889 is provided with a first and reverse gear shifter arm 12 and a second and high gear shifter arm 14, which arms are pivotally connected through suitable linkages 16 and and 18 respectively to gear train selector arms 20 and 22 respectively of a transmission gear selector unit 24. Selective movement of the arms 20 and 22 will cause selective rotation of the arms 12 and 14 to thereby accomplish the gear shifting in the transmission in the conventional manner.

The transmission selector unit 24 has integrally associated therewith a shifting cane 26 which is rotatably mounted in the upper portion 28 of the steering column 30. A shifting lever 32 is pivotally mounted to cane 26 and portion 28 in the conventional manner and is movable either clockwise or counterclockwise to rotate cane 26 and is also pivotally movable up or down to move the shifting cane either to the right or left of FIGURE 1.

The bottom portion of the shifting cane 26 is provided with splines 34 spaced around the circumference thereof and is rotatably mounted in the bushings 48 and 50 rotatably mounted in bearings 44 and 46 respectively in flanges 36 and 38 of the U-shaped bracket 40, which bracket is secured by suitable means 42 to the steering column 30. Secured to bushings 48 and 50, respectively, are the gear train selector arms 20 and 22, which arms when rotated cause rotation of the bushings 48 and 50 around the peripheral ridge portions of splined cane 26.

A shifting pin 52 is secured in the end of a shifting finger 54 provided with an internally splined sleeve end 56 which is slidable longitudinally of cane 26 with its splines 58 meshing with splines 34 of the shifting cane. A stop washer or shoulder 60 is provided on cane 26 to abut the bottom of sleeve end 56 and cause the sleeve and pin 52 associated therewith to move to the right of FIGURE 3 as cane 26 is moved to the right by upward pivotal movement of shift lever 32 to engage either the flat undersurface 62 of arm 20 or the shifting aperture or abutment 64 in said arm. Should the pin 52 engage this undersurface or bearing means 62 of arm 20 the lever 32 must then move either clockwise or counterclockwise to bring the pin 52 in registration with aperture 64. Subsequent movement of the lever 32 in a clockwise or counterclockwise direction will rotate arm 20 to actuate link 16 and shifter arm 12 to shift the transmission to either reverse or first gear.

Springs 66 and 68 urge the cane 26 and the sleeve 56 respectively to the left in FIGURE 3 and cause both the cane 26 and the pin 52 to move to the left after the lever 32 is released to thereby engage the pin 52 with a bearing surface 70 of the arm 22 so that shifting to either second or high gear can be accomplished by merely moving the shifting lever 32 clockwise or counterclockwise as desired until pin 52 engages in the shifting aperture or abutment 72 in arm 22 allowing further rotative motion of the cane 26 to impart rotative movement of arm 22 to the second or high shifting arm 14 through link 18. Washer 67 and bolt 69 retain spring 66 on cane 26 and washer type springs 74 secured to bushings 48 and 50 by lock washers 76 abut the legs 36 and 38 of bracket 40 and resiliently secure bushings 36 and 38 in said legs.

It is noted that pin 52 is sufficiently long so that release of lever 32 from the upward or first-reverse shifting position will not disengage the pin 52 from the aperture 64 until arm 20 is rotated to a position wherein apertures 64 and 72 are aligned at which time arm 20 will have positioned the first-reverse train in neutral position and have picked up the second high shifting arm 22. The pin 52 is simultaneously partially entered in apertures 64 and 72 of arms 20 and 22 when these apertures are aligned and thereby prevents the two gear trains, reverse-low and second-high, from being simultaneously partially engaged. Also, this simultaneous engagement of arms 20 and 22 is useful in initially setting the position of these selector arms, the shifting lever 32, and the gear shifter arms 12 and 14 since the transmission must be in neutral when pin 52 is simultaneously engaged in the apertures 64 and 72.

I claim:

1. A gear shifting device comprising: a manually operable shifting member rotatably and longitudinally movably mounted on a vehicle steering column; shifting finger means carried by said shifting member for rotation therewith and slidable movement thereon; selectively operable gear train selector means adapted for connection to different gear trains; means associated with said shifting member for moving said finger means into operative engagement with one of said selector means upon longitudinal movement of said shifting member in one direction; means for maintaining said finger means in operative engagement with said one selector means after said shifting member has been rotated and returned to its original longitudinal position; and means constantly urging said finger means toward another of said selector means whereby at a predetermined relative angular position of said one selector means and said another selector means said finger means will disengage said one selector means and operatively engage said another selector means.

2. A gear shifting device comprising: a manually operable shifting member rotatably and longitudinally movably mounted on a vehicle steering column; shifting finger means carried by said shifting member for rotation therewith and slidable movement thereon; selectively operable gear train selector means adapted for connection to different gear trains; means associated with said shifting member for moving said finger means into operative engagement with one of said selector means upon longitudinal movement of said shifting member in one direction; bearing means on another of said selector means for maintaining said finger means in operative engagement with said one selector means after said shifting member has been rotated and returned to its original longitudinal position; and means urging said finger means against said bearing means whereby at a relative predetermined angular position of said one selector means and said another selector means said finger means will disengage said one selector means and operatively engage said another selector means.

3. A gear shifting device comprising: a manually operable shifting member rotatably and longitudinally movably mounted on a vehicle steering column; shifting finger means carried by said shifting member for rotation therewith and slidable movement thereon; selectively operable gear train selector means adapted for connection to different gear trains; abutment means on each of said selector means; means associated with said shifting member for moving said finger means into operative engagement with the abutment means of one of said selector means upon longitudinal movement of said shifting member in one direction; bearing means on another of said selector means for maintaining said finger means in operative engagement with the said abutment means after said shifting means has been rotated and returned to its original longitudinal position; and means urging said finger means against said bearing means so that at a relative predetermined angular position of each said selector means said finger means will disengage the said abutment means on said one selector means and operatively engage the abutment means on said another selector means.

4. A gear shifting device comprising: a manually operable shifting member rotatably and longitudinally movably mounted on a vehicle steering column; first and second spaced selectively operable gear train selector means adapted for connection to different gear trains; shifting finger means carried by said shifting member for rotation therewith and slidable movement thereon positioned between said first and second selector means; means associated with said shifting member for moving said finger means into operative engagement with said first selector means upon longitudinal movement of said shifting member in one direction; means for maintaining said finger means in operative engagement with said first selector means after said shifting member has been rotated and returned to its original longitudinal position; and means urging said shifting finger toward said second selector means whereby at a predetermined relative angular position of each of said selector means said finger means will disengage said first selector means and operatively engage said second selector means.

5. A gear shifting device comprising: a manually operable shifting member rotatably and longitudinally movably mounted on a vehicle steering column; first and second spaced selectively operable gear train selector means adapted for connection to different gear trains; shifting finger means carried by said shifting member for rotation therewith and slidable movement thereon positioned between said first and second gear train selector means; means associated with said shifting member for moving said finger means into operative engagement with said first selector means upon longitudinal movement of said shifting member in one direction; bearing means on said second selector means for maintaining said finger means in operative engagement with said first selector means after said shifting member has been rotated and returned to its initial longitudinal position; and means constantly urging said shifting finger toward said bearing means on said second selector means whereby at a predetermined relative angular position of each of said selector means said finger means will disengage said first selector means and operatively engage said second selector means.

6. A gear shifting device comprising: a manually operable shifting member rotatably and longitudinally movably mounted on a vehicle steering column; first and second spaced selectively operable gear train selector means adapted for connection to different gear trains and each having abutment means provided thereon; shifting finger means carried by said shifting member for rotation therewith and slidable movement thereon positioned between said first and second gear train selector means; engaging means carried by said shifting finger for selectively engaging the said abutment means provided on each of said selector means; means associated with said shifting member for moving said engaging means into operative engagement with the abutment means on said first selector means upon movement of said shifting member longitudinally in one direction; bearing means on the other of said selector means for maintaining said engaging means in said just mentioned operative engagement after said shifting means has been rotated and returned to its original longitudinal position; and means urging said engaging means into engagement with said bearing means whereby at a predetermined relative angular position of each of said selector means said engaging means will disengage the said abutment means of said first selector means and operatively engage the abutment means on said second selector means.

7. A gear shifting device comprising: a manually operable shifting member rotatably and longitudinally movably mounted on a vehicle steering column; first and second spaced selectively operable gear train selector means adapted for connection to different gear trains and each having an aperture therein; shifting finger means carried by said shifting member for rotation therewith and slidable movement thereon positioned between said first and second gear train selector means; a pin extending each way from said shifting finger and adapted to selectively engage said apertures in said gear train selector means; means associated with said shifting member for moving said shifting finger to operatively engage one end of said pin in the aperture in said first selector means upon longitudinal movement of said shifting member in one direction; bearing means on said second selector means for engaging the opposite end of said pin to maintain said pin in engagement with the said aperture in said first selector means after said shifting member has been rotated and returned to its original longitudinal position; means urging said pin against said bearing means whereby at a predetermined relative angular position of said first and second selector means said pin will disengage the said aperture in said first selector means and operatively engage the aperture in said second selector means; and means operable to return said shifting member to its said original longitudinal position.

References Cited in the file of this patent
UNITED STATES PATENTS

| | | |
|---|---|---|
| 2,179,368 | Baade | Nov. 7, 1939 |
| 2,198,681 | Slack | Apr. 30, 1940 |
| 2,242,038 | McCordic | May 13, 1941 |
| 2,301,484 | Wahlberg | Nov. 10, 1942 |